(No Model.) 8 Sheets—Sheet 1.
A. K. PHILLIPS.
BORING AND SHAPING MECHANISM.

No. 481,307. Patented Aug. 23, 1892.

(No Model.) 8 Sheets—Sheet 2.
A. K. PHILLIPS.
BORING AND SHAPING MECHANISM.

No. 481,307. Patented Aug. 23, 1892.

(No Model.) 8 Sheets—Sheet 3.

A. K. PHILLIPS.
BORING AND SHAPING MECHANISM.

No. 481,307. Patented Aug. 23, 1892.

Witnesses
Jno. G. Hinkel
Alle N. Dobson

A. K. Phillips
Inventor
By
Foster & Freeman
Attorneys (No Model.) 8 Sheets—Sheet 4.
A. K. PHILLIPS.
BORING AND SHAPING MECHANISM.
No. 481,307. Patented Aug. 23, 1892.

(No Model.) 8 Sheets—Sheet 5.

A. K. PHILLIPS.
BORING AND SHAPING MECHANISM.

No. 481,307. Patented Aug. 23, 1892.

Witnesses
Jno. J. Hinkel
Alex N. Dobson

A. K. Phillips
Inventor
By Foster & Freeman
Attorneys (No Model.)  8 Sheets—Sheet 6.
A. K. PHILLIPS.
BORING AND SHAPING MECHANISM.
No. 481,307.  Patented Aug. 23, 1892.
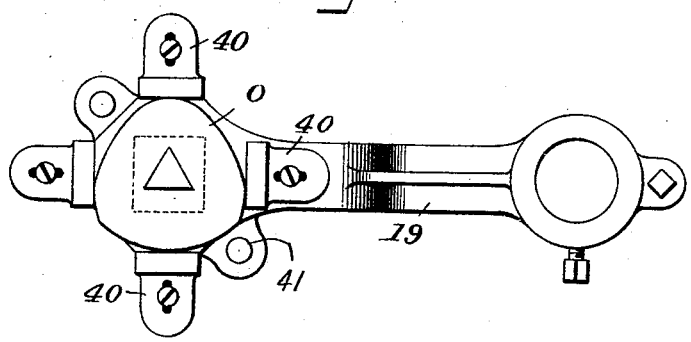
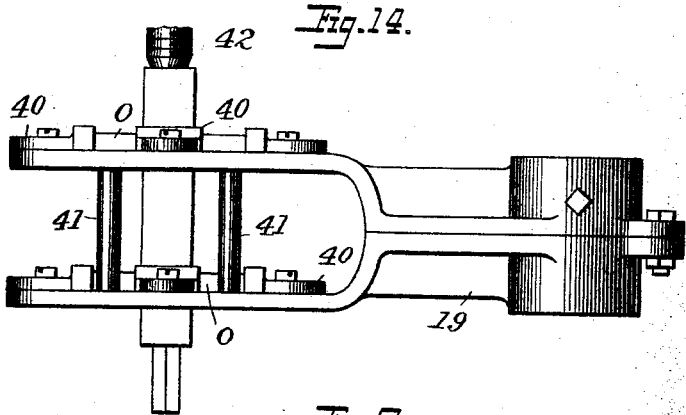
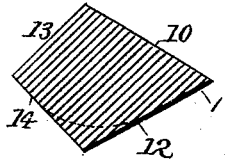
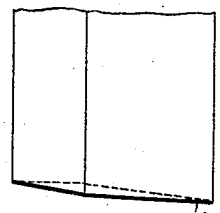
Witnesses
Jno. G. Hinkel
H. S. McArthur
Inventor
Augustus K. Phillips
By Foster Freeman
Attorneys (No Model.) 8 Sheets—Sheet 7.
A. K. PHILLIPS.
BORING AND SHAPING MECHANISM.

No. 481,307. Patented Aug. 23, 1892.

Witnesses
Inventor
Augustus K. Phillips
By Foster Freeman
Attorneys (No Model.) 8 Sheets—Sheet 8.
A. K. PHILLIPS.
BORING AND SHAPING MECHANISM.
No. 481,307. Patented Aug. 23, 1892.
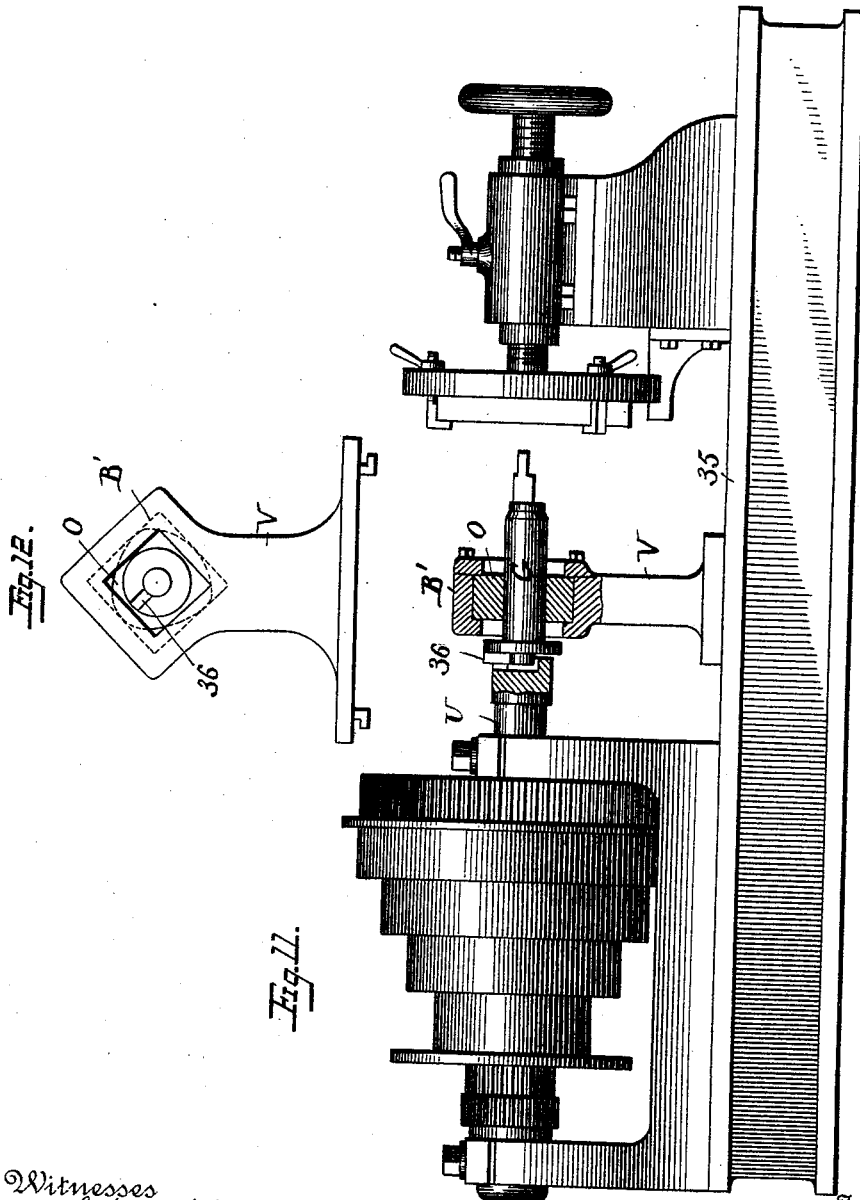

UNITED STATES PATENT OFFICE.

AUGUSTUS K. PHILLIPS, OF ST. LOUIS, MISSOURI.

BORING AND SHAPING MECHANISM.

SPECIFICATION forming part of Letters Patent No. 481,307, dated August 23, 1892.

Application filed October 27, 1891. Serial No. 410,008. (No model.)

*To all whom it may concern:*

Be it known that I, AUGUSTUS K. PHILLIPS, a citizen of the United States, residing at St. Louis, Missouri, have invented certain new and useful Improvements in Boring and Shaping Mechanism, of which the following is a specification.

The object of my invention is to so direct a tool that its cutting point or edge or operating-face shall travel in a path corresponding to the lines and angles of a rectilineal figure having any desired number of lines and angles; and it consists in means fully set forth hereinafter whereby such movements of the tool are effected through the medium of a guide and former of peculiar construction.

Figure 1:
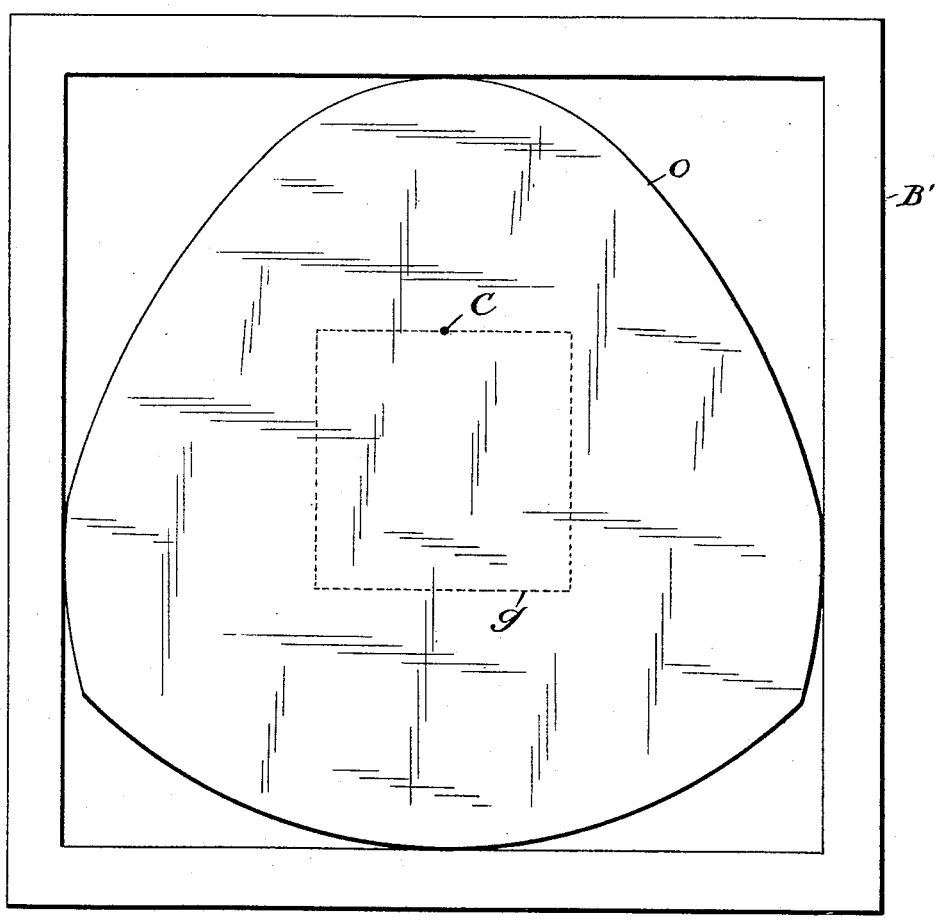
Figures 9, 10:
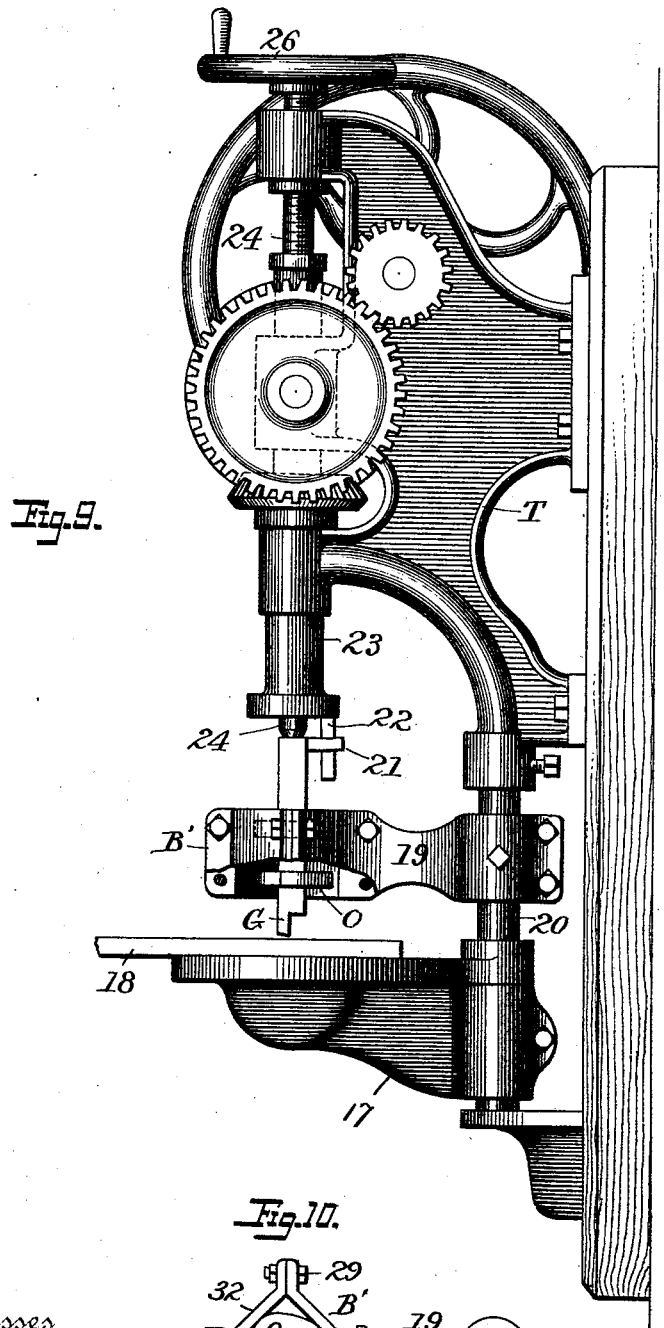

In the accompanying drawings, Figure 1 is a diagrammatic view illustrating the main features involved in the construction of the guide and former and the line of path of the tool in cutting a square figure. Figs. 2, 3, 4, 5, and 6 illustrate the method of laying out the patterns for making formers to be used in cutting different rectilineal figures. Fig. 7 is a sectional plan, and Fig. 8 an elevation, showing one form of tool that may be used. Fig. 9 is an elevation illustrating my invention as applied to a boring-machine. Fig. 10 is a plan of the guide and former, Fig. 9; Fig. 11, a sectional elevation showing my improvement in connection with a lathe; Fig. 12, a side elevation of the guide and former, Fig. 11. Fig. 13 is a plan showing a modified construction of guide and support therefor. Fig. 14 is a side elevation of the parts shown in Fig. 13.

Before describing the applications of my invention and the special construction of operating devices embodying the same I will refer to my discovery of the fact that a plate or block, which I shall hereinafter term a "former," may be made upon a systematic plan, of such shape as to be capable of free rotation, but without any lateral play whatever, in a regular rectilineal opening or in a guide having faces or bearings coinciding with the sides of a regular rectilineal opening, with a point in such former that upon the rotation of the same will travel in a path coinciding with the form of the outline of the said opening. Having secured this result, the application of the same may be made in various ways to guide or operate a cutting or forming tool to cut rectilineal forms, either as openings in blocks or plates or to externally shape any desired body. Thus, referring to Fig. 1, O represents a former of proper shape for use in cutting a square opening or figure, and B' is a frame constituting a guide, the opening in the frame in such case being square, but larger than the form to be cut. The point C in the former O, the position of which is determined as hereinafter set forth, will, upon the rotation of the former in the guide, travel in a path indicated by the dotted lines *g*, constituting the outline of a figure coinciding in form with but smaller than the outline of the opening in the guide. If now a suitable tool is arranged upon the former with its cutting point or edge coinciding with the point C and if the former is rotated with the cutting point or edge of the tool in contact with the article to be cut or shaped, the tool will travel in contact with said article to impart thereto a shape externally or internally, as may be arranged for, coinciding with the outline indicated in dotted lines. During the rotation of the former it must have at all times at least three bearing-points upon different faces of the guide, which bearing-points must change during said rotation, but without any binding or undue friction, and which bearing-points must be so disposed that the former can have no free motion or side play between its bearings. To secure this result, a former that is intended to operate to carry the tool to cut a figure having one outline must be somewhat differently shaped from the former used in cutting a figure of another outline, and in order that the principle of construction which I have discovered of such different formers may be fully understood I will describe the manner in which I lay out or produce the patterns of several different formers and the co-operating guides required for cutting forms of different shapes, the sizes of the guides to be used being practically optional.

Figure 2:
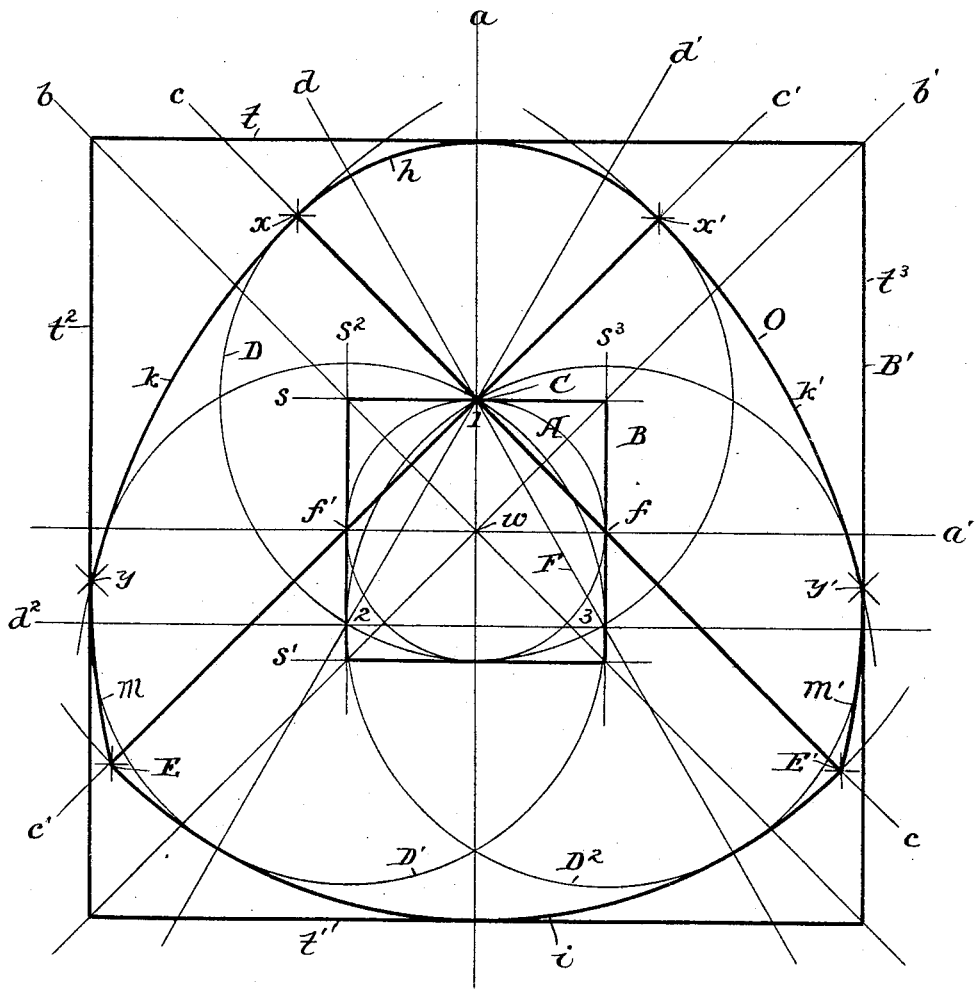

Fig. 2 illustrates the manner of laying out the former and guide to be used with a tool for cutting a square opening, or the outer shape of the body or article to be squared to correspond in size to that of the square B, which is done as follows:

Draw the perpendicular line *a* and line *a'*, intersecting it at right angles. This fixes the common center $w$, about which to form the plane of the figure.

From point $w$ describe the circle A with a radius that will inscribe a square of the size it is desired to shape. About this circle by lines $s\ s'\ s^2\ s^3$ describe the square B.

Equidistant from square B on all its sides by lines $t\ t'\ t^2\ t^3$ describe the square B' of a size it is intended to use as a guide.

Through point $w$ and the opposing angles of the square B' draw lines $b\ b'$.

Through the intersection of lines $s\ a$ at C and the intersection of lines $s^3\ a'$ at $f$ and lines $s^2\ a'$ at $f'$ draw, respectively, the lines $c\ c'$. The point C indicates the point to which is set the shaping point or edge of the cutting-tool employed.

In square B define the equilateral triangle F by lines $d\ d'\ d^2$, intersecting on and with the lines of the square at points 1 (C) 2 3, constituting centers.

From centers 1 2 3 describe, respectively, the three circles D D' D², each with a radius taken from point C through line $a$, to touch its intersection with line $t$. Points $x\ x'$ are formed by the intersection of circle D with lines $c\ c'$, respectively, defining a curve $h$.

From point C describe the curve $i$, with a radius touching the intersection of lines $a\ t'$ to intersect $c\ c'$, creating points E' E, respectively.

From points E E' describe the curves $k'\ k$, commencing at points $x'\ x$ and prolonged to the side lines of square B', creating thereon points $y'\ y$, respectively. The radius of these two curves is the diameter of a circle inscribing B'.

From points $y\ y'$ describe the curves $m'\ m$, commencing at points E' E to intersect curves $k'\ k$ at points $y'\ y$, respectively. The radius of these two curves is the diameter of a circle inscribing B'. The signs X mark the limits of the respective curves $h\ i\ k\ k'\ m\ m'$, which define the outline of the completed figure O.

Figure 3:
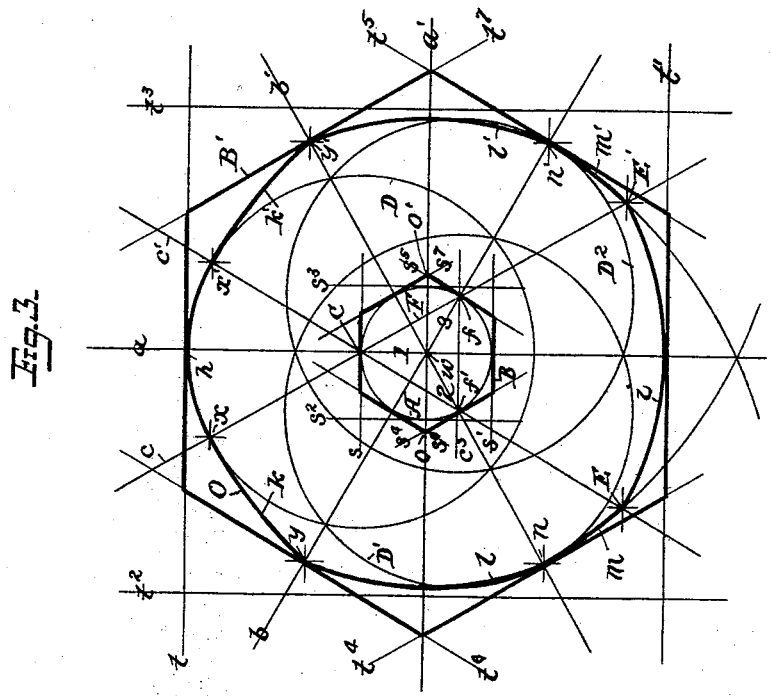

In laying out the pattern of former and guide to be used for cutting a hexagonal figure I proceed as follows, reference being had to Fig. 3.

Draw the perpendicular line $a$ and line $a'$, intersecting it at right angles. This fixes the common center $w$, about which to form the plane of the figure.

From point $w$ describe the circle A with a radius that will inscribe a hexagon of the size it is intended to shape. About this circle, by lines $s\ s'\ s^4\ s^5\ s^6\ s^7$, describe the hexagon B; also, draw lines $s^2\ s^3$, defining a square, with the lines $s\ s'$, to illustrate the relation of a hexagon to a square.

Equidistant from hexagon B on all its sides, by lines $t\ t'\ t^4\ t^5\ t^6\ t^7$, describe the hexagon B' of a size it is intended to use as a guide; also, draw lines $t^2\ t^3$, defining a square with lines $t\ t'$.

Through point $w$ draw the lines $b\ b'$ to intersect the centers of the diagonal sides of figures B B' at right angles thereto.

Through the intersection of lines $s\ a$ at C and through the intersections of lines $s^5\ b$ at $f$ and lines $s^4\ b'$ at $f'$ draw, respectively, the lines $c\ c'$. Point C indicates the point to which is set the shaping point or edge of the cutting-tool employed.

In hexagon B define the equilateral triangle F by line $c^3$, drawn in connection with lines $c\ c'$, intersecting on and with the lines of the hexagon at points 1 (C) 2 3, constituting centers.

From centers 1 2 3 describe, respectively, the three circles D D' D², each with a radius taken from point C through line $a$ to touch its intersection with line $t$. Points $x\ x'$ are formed by the intersection of circle D with lines $c\ c'$, respectively, defining a curve $h$.

From point C describe the curve $i$ with a radius touching the intersection of lines $a\ t'$ to intersect lines $c\ c'$, respectively, creating points E' E.

From points E E' describe the curves $k'\ k$, commencing at points $x'\ x$ and to touch the lines $t^7\ t^6$, respectively, creating thereon points $y'\ y$. The radius of these two curves is the diameter of a circle inscribing B'.

From points $y\ y'$ describe the curves $m'\ m$, commencing at points E' E and to touch the lines $t^5\ t^4$, respectively. The radius of these two curves is also the diameter of a circle inscribing B'.

From the intersection of lines $s^4\ s^6$ at $o$ and of lines $s^5\ s^7$ at $o'$ describe the curves $l'\ l$, commencing at points $y'\ y$ to intersect curves $m'\ m$, respectively, creating points $n'\ n$. The radius of these two curves is the distance from point C through line $a$ to its intersection with curves $i$. The signs X mark the limits of the respective curves $h\ i\ k\ k'\ m\ m'\ l\ l'$, which define the outline of the completed figure O.

Figure 4:
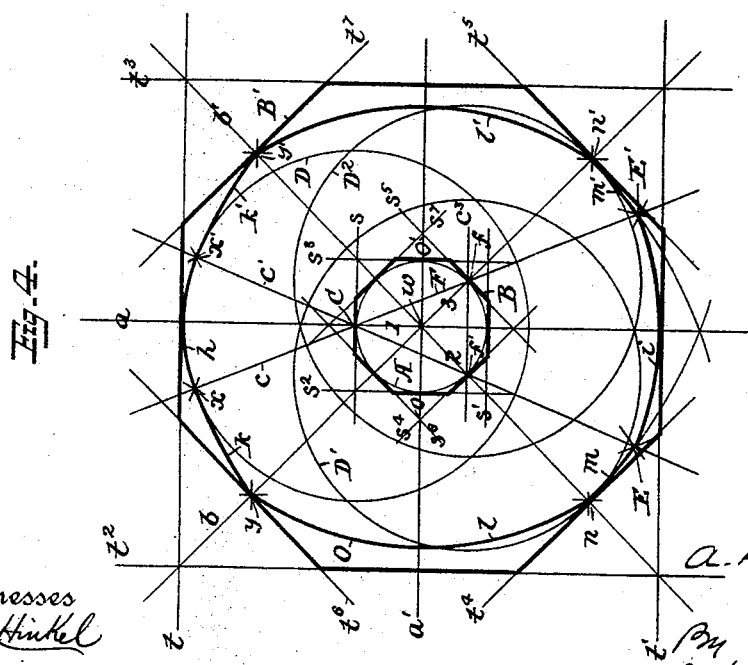
Figure 5:
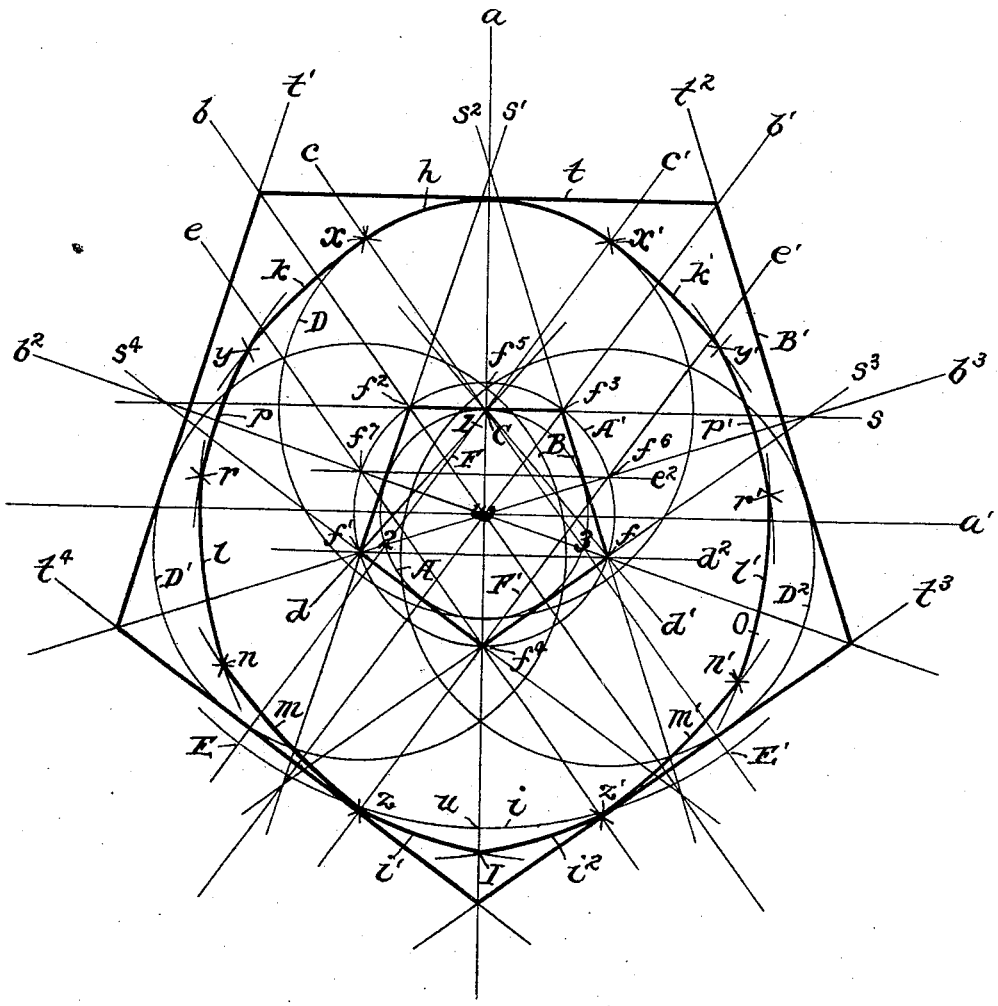
Figure 6:
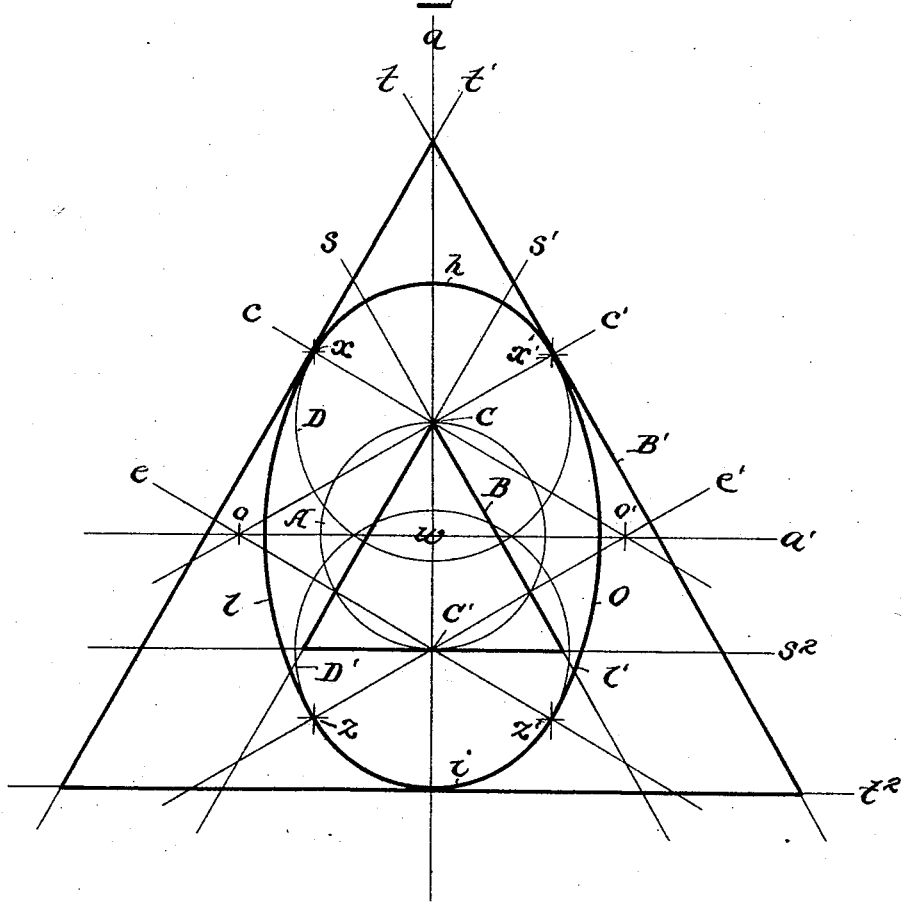

In laying out the pattern for cutting an octagonal figure I proceed as follows, referring to Fig. 4.

Draw the perpendicular line $a$ and line $a'$, intersecting it at right angles. This fixes the common center $w$ about which to form the plane of the figure.

From point $w$ describe the circle A, with a radius that will inscribe an octagon of the size it is intended to shape. About this circle by lines $s\ s'\ s^2\ s^3\ s^4\ s^5\ s^6\ s^7$ describe the octagon B.

Equidistant from octagon B on all its sides by lines $t\ t'\ t^2\ t^3\ t^4\ t^5\ t^6\ t^7$ describe the octagon B' of the size it is intended to use as a guide.

Through point $w$ draw the lines $b\ b'$ to intersect the centers of the diagonal sides of figures B B' at right angles thereto.

Through the intersection of lines $s\ a$ at C and through the intersections of lines $s^5\ b$ at $f$ and lines $s^4\ b'$ at $f'$, respectively, draw the lines $c\ c'$. Point C indicates the point to which is set the shaping point or edge of the cutter-tool employed.

In octagon B define the triangle F by line $c^3$, drawn in connection with lines $c\ c'$, intersecting on and with the lines of the octagon at points 1 (C) 2 3, constituting centers.

From centers 1 2 3 describe, respectively, the three circles D D' D² with a radius taken from point C through line $a$ to touch its intersection with line $t$. Points $x$ $x'$ are formed by the intersection of circle D with lines $c$ $c'$, respectively, defining a curve $h$.

From point C describe the curve $i$, with a radius touching the intersection of lines $a$ $t'$, to intersect lines $c$ $c'$, creating points E' E, respectively.

From points E E' describe the curves $k'$ $k$, commencing at points $x'$ $x$ and to touch the lines $t^7$ $t^6$, respectively, creating thereon points $y'$ $y$. The radius of these two curves is the diameter of a circle inscribing B'.

From points $y$ $y'$ describe the curves $m'$ $m$, commencing at points E' E and to touch the lines $t^5$ $t^4$, respectively. The radius of these two curves is also the diameter of a circle inscribing B'.

From the intersection of lines $s^4$ $s^6$ at $o$ and of lines $s^5$ $s^7$ at $o'$ describe the curves $l'$ $l$, commencing at points $y'$ $y$ to intersect curves $m'$ $m$, respectively, creating points $n'$ $n$. The radius of these two curves is the distance from point C through line $a$ to its intersection with curve $i$. The signs X mark the limits of the respective curves $h$ $i$ $k$ $k'$ $m$ $m'$ $l$ $l'$, which define the outline of the completed figure O.

The pattern for use in cutting a pentagonal figure (illustrated in Fig. 5) is laid out as follows:

First. Draw the perpendicular line $a$ and line $a'$, intersecting it at right angles. This fixes the common center $w$ about which to form the plane of the figure.

Second. From point $w$ describe the circle A' with a radius that will describe about a pentagon of the size it is intended to shape and defining point $f^5$. In this circle by lines $s$ $s'$ $s^2$ $s^3$ $s^4$ inscribe the pentagon B with its angle-points $f$ $f'$ $f^2$ $f^3$ $f^4$, and within the pentagon describe the circle A.

Third. Equidistant from pentagon B on all its sides by lines $t$ $t'$ $t^2$ $t^3$ $t^4$ describe the pentagon B' of the size it is intended to use as a guide.

Fourth. Through point $w$ draw lines $b$ $b'$ $b^2$ $b^3$, each bisecting equally the figures B B'.

Fifth. Through the intersection of lines $s$ $a$ at C draw the lines $c$ $c'$, parallel to lines $b$ $b'$, respectively, and through point $f^4$ draw the lines $e$ $e'$ parallel to lines $b$ $b'$, respectively. Point C indicates the point to which is set the shaping-point of the cutting-tool employed.

Sixth. In pentagon B by lines $d$ $d'$ $d^2$ define the triangle F, with its angle-points 1 2 3 at C $f'$ $f$, respectively, constituting centers. From centers 1 2 3 describe, respectively, the circles D D' D² with a radius taken through line $a$ to touch its intersection with line $t$. Points $x$ $x'$ are formed by the intersection of circle D with lines $c$ $c'$, respectively, and define curve $h$.

Seventh. Draw lines $e^2$ through the intersections of lines $e$ $e'$ with the upper periphery of circle A', defining, in connection with these lines, the triangle F' with its angle-points $f^4$ $f^6$ $f^7$.

Eighth. From point C describe the curve $i$ with a radius that will touch a point $u$ on line $a$ produced by a circle inscribing pentagon B' from point $w$, the curve $i$ to intersect lines $c$ $c'$, creating points E' E, respectively.

Ninth. From points E E' describe the curves $k'$ $k$, commencing at points $x'$ $x$, respectively, and prolonged to the side lines of B'. The radius of these two curves is the diameter of a circle inscribing B'.

Tenth. From points $f^2$ $f^3$ describe the curves $i^2$ $i'$, commencing at points $z'$ $z$, the intersection of lines $e$ $e$ with lines $t^3$ $t^4$, respectively, and to intersect on line $a$, defining point I.

Eleventh. From points on lines $e'$ $e$, with a radius the diameter of a circle inscribing B', describe the curves $m$ $m'$, commencing at points $z$ $z'$, respectively, and prolonged to the side lines of B'.

Twelfth. From points $f$ $f'$, with the same radius as curve $i$, describe the curves $p$ $p'$ to intersect curves $k$ $k'$, respectively, defining points $y$ $y'$.

Thirteenth. From points $o$ $o'$, with a radius taken through line $a$ from point $f^5$ to point I, describe the curves $l'$ $l$ to intersect the curves $m'$ $p'$ and $m$ $p$, respectively, these respective intersections defining points $n'$ $r'$ and $n$ $r$. The signs X mark the limits of the respective curves $h$ $i$ $i'$ $i^2$ $k$ $k'$ $m$ $m'$ $p$ $p'$ $l$ $l'$, which define the outline of the completed figure O.

All of the formers above described are irregular in outline; but for cutting a triangle figure a former of regular outline is used, and there are two points, to either of which the cutting point or edge of the tool may be placed. Such patterns are laid out as follows, reference being had to Fig. 6.

Draw the perpendicular line $a$ and line $a'$, intersecting it at right angles. This fixes the common center $w$ about which to form the plane of the figure.

From point $w$ describe the circle A, having the diameter of an equilateral triangle of the size it is desired to shape, and then by lines $s$ $s'$ $s^2$ form the triangle B, defining at its apex where cut by line $a$ the point C. Point C indicates the point to which is set the shaping point or edge of the cutting-tool employed, or it may in this case be set to the intersection of line $a$ with the bottom side of B—viz., at C'.

Equidistant from triangle B on all its sides by lines $t$ $t'$ $t^2$, describe the triangle B' of a size it is intended to use as a guide.

From points C C', with a radius touching the contiguous sides of triangle B', describe the circles D D', respectively.

Through points C C', at right angles to the sides of triangle B' and intersecting them, respectively, draw the lines $c$ $c'$ and $e$ $e'$, respectively, creating points $o$ $o'$ $x$ $x'$ $z$ $z'$ and defining curves $h$ $i$.

From points $o\ o'$ describe the curves $l'\ l$, respectively, with a radius connecting the area of circles D D' at the points $x\ x'\ z\ z'$. The signs X mark the limits of the respective curves and the lines $h\ i\ l\ l'$ define the outline of the completed figure O.

Upon comparing the operations in laying out the above-described different patterns it will be evident they are systematically similar in all, the principal steps being the same, there being only such subordinate variations or additions in the respective cases as result from the differences in the shape of the figure to be cut. Therefore the method of laying out the figures shown being known, others may be planned upon the same principles, and the system deduced therefrom common to all may be summarized as follows:

First. The figure B, representing the form and size to be shaped, and B', its relative guide, are laid out from a common center, are conformably placed equidistant one from the other on all sides, and bisected equally by the line $a$ passing through the common center and the center of either side of the figures.

Second. The pattern O is laid out about a controlling-point—that is, the location fixed for the shaping-point of a cutting-tool, which describes in its rotation by the former the lines of a rectilineal figure. This point is always at the intersection of line $a$ with figure B at the center of circle D.

Third. The circle D, which forms curve $h$, the central top curve of the former O, is described from point C with a radius touching figure B' where intersected by line $a$. When there are two circles $D'\ D^2$, they are described from points upon figure B that are points of a triangle F contained within that figure. Each of circles $D\ D'\ D^2$ touch at least one side of B'.

Fourth. Lines $c\ c'$, which define points $x\ x'$ and E E', are drawn through point C and control the limits of curve $h$. The angles of direction from line $a$ for lines $c\ c'$ are determined by the rule: first, it is the same either side of line $a$; second, these lines define curve $h$ with a length in degrees having the same proportion to the circle of which it is a segment that one side of the figure B' bears to the whole figure—that is, in the square it is ninety degrees, or one to four; in the pentagon seventy-two degrees, or one to five; in the triangle one hundred and twenty degrees, or one to three, &c.

Fifth. Curve $h$, defined by points $x\ x'$, is the exact segment of circle D, which defines the points that are the points of contact between the former O and guide B' when the former is centered through line $a$ with any angle of B'. When so centered, point C (the point for the tool) is at the corresponding angle-point of B, equidistant through lines $c\ c'$ from the sides of B'.

Sixth. It is through lines $c\ c'$ drawn, as described, at their intersections with $i$ that points E E' are formed, and from which are described curves $k\ k'$, the adjoining curves to curve $h$. The radius of curves $k\ k'$ is always the diameter of a circle inscribing figure B'.

Seventh. Curves $h$ and $i$ are each described from point C.

Eighth. Point $l$ of triangle F always coincides with point C. In the pattern for the triangle F is the figure B itself.

Ninth. Curves $m\ m'$ in even-sided figures are described from points $y'\ y$, the intersections of curves $k'\ k$ with side lines of figure B'. In odd-sided figures they are described from points on lines $e\ e'$ with the same radius as in even-sided figures. The radius of curves $m\ m'$ is the diameter of a circle inscribing figure B'.

Tenth. Curves $l\ l'$ are described from points $o'\ o$, where side lines of figure B' intersect, or would if extended, with line $a'$.

In the triangle pattern points $o\ o'$ are developed on line $a'$ where lines $e'\ e$ intersect thereon, those lines, respectively, forming side lines to a triangle of the size of B, line $a$ forming one other side. It will be seen that in any case the former has at least three points of bearing at all times, while there are in the case of the square four points of constant bearing as between the former O and the guide B' when the former or the guide is revolved. In that of the triangle there are not more than three, and in the case of the pentagon there are not more than three when the former is in certain positions in the guide B'; but in any of these the only possible movement of the former O in the guide B' must carry the point 1 of the triangle F on the lines of the rectilineal figure it is formed to make, as the curves or points of the former that are bearing at the time against the sides of guide B' force that point to move only on those lines.

In the application of any one of these constructions to the movement of a tool for shaping an opening or the exterior of a body I so arrange the tool that the edge, point, or corner that must travel in a path corresponding to the outline of the opening or body to be shaped shall coincide with the point which is the center of the circle D.

According to the character of the operations and the nature of the material operated upon the tool is differently shaped. Preferably it is angular, as indicated in shaded lines, Figs. 7 and 8, with the outer edge at 1.

A favorable construction for cutting metal is a bar four-sided in cross-section with two acutely-converging faces 10 12 and two heel-faces 13 14, forming an obtuse angle. The end of the bar is so shaped that the point or corner 1 (corresponding with the corner 1 of triangle F) shall be the lowest or project to a slight extent—say one-sixteenth of an inch—beyond the other parts, the faces tapering to said point. When the former B rotates, the point 1 cuts in advance of the remaining edges 12 14 of the tool, for which in some cases an under and side curved cutting-edge may be substituted, as shown in dotted lines in Fig. 7.

Should it be desired to shape the exterior of an article, as a nut, the tool is set with its cutting-edge to act exteriorly to the lines of the shape to be cut.

A practical embodiment of my invention, operated in connection with a drill or boring-machine, is shown in Fig. 9, in which T is the frame of the drill; 17, a table, supporting the material to be cut, and above the latter is the guide B', which, as shown, is part of or upon an arm 19, supported by a post 20, (having in this case its upper support in a socket in the frame T,) so as to be adjusted vertically and radially. Within the recess of the guide B' is the former O, consisting of two plates carrying the tool G. This former may be driven or revolved in any suitable manner. As shown, it carries the tool, and the latter has a lateral arm 21, which makes contact with a pendent arm 22 on the drill-sleeve 23, rotated as usual.

In the construction shown in Figs. 9 and 10 a feed-screw 24 is passed downward through the revolving sleeve 23 and bears upon the tool-shank, being fed downward by turning the usual hand-wheel 26.

Fig. 10 shows the form of the arm 19 in two sections, bolted together by bolts 28 and constituting two sides of the guide, while the other two sides 32 33 are bolted together and to the sections of the arm by bolts 29 30. This permits ready access to the bearing-faces for machining.

In the application of the invention to an ordinary horizontal lathe, Figs. 11 and 12, the support V for the guide B' is upon the bed 35, and the former O turns in the guide, but does not travel therein as in Figs. 9 and 10. The tool G has an angular shank and fits an opening in the former, and at the outer end has a lug 36, extending into a recess in the annular flange at the end of the head-stock U, so that the tool and former will turn with the head-stock with such independent play of the tool as the circumstances require. In this case the work is carried by the tail-stock and fed to the tool.

In the construction shown in Figs. 13 and 14 the guide is formed by setting a number, as four, guide-pieces 40 (adjustable by screws and slots) upon an arm 19, and the former O turns between the edges of said guide-pieces. Where greater support for the tool is required, the arm may be in two sections, one above the other, connected by posts 41, the tool extending through the two plates constituting the former and being fed downward independently of the former by a screw 42, the tool and former being revolved by any suitable means.

For rose-machines for engraving a great variety of forms may be cut by slightly changing the position of the cutting-point of the tool as regards the point C. It will of course be evident that if the former were stationary and the guide revolved around it with an arm supporting the tool at the point C the result would be the same.

I am aware that different attempts have been made to bore rectilineal openings by means of tools carried by cams; but in all such cases the cams have not been constructed so as to carry the tool-points into the corners or angles, and consequently the openings formed had straight sides but rounded corners and required subsequent trimming to properly shape them, so that the boring was to little purpose.

My invention consists in so defining the cam as to insure a tool movement that cuts an absolutely rectilineal opening or shape, avoiding the necessity of any additional operations, and, as above set forth, I have discovered a systematic mode of laying out such cams that will enable any one to make a cam to cut any desired rectilineal figure with precision and accuracy.

Without limiting myself to the precise forms and applications shown, I claim—

1. A former for shaping and cutting rectilineal figures, consisting of a block or cam constructed, as herein described, to revolve in a guide having the same number of sides as the figure to be cut and provided with means for supporting a tool at a point that travels in a path coinciding at all parts with the outline of the rectilineal figure to be shaped or cut, substantially as set forth.

2. The combination of a guide having the same number of sides as a rectilineal figure to be cut or shaped, and a former constructed, as herein described, to revolve without lost motion in said guide and provided with a tool arranged at a point traveling in a path corresponding at all parts with the rectilineal figure to be cut, substantially as set forth.

3. The combination of the guide, former constructed as herein set forth, and tool connected with the former at a point of the latter that travels in a rectilineal path, the end face of said tool inclined toward a point lower than the remaining parts of the face, substantially as described.

In testimony whereof I have signed my name to this specification in the presence of two subscribing witnesses.

AUGUSTUS K. PHILLIPS.

Witnesses:
CHARLES E. FOSTER,
GEORGIA P. KRAMER.